R. C. BERRY.
HACKSAW MACHINE.
APPLICATION FILED OCT. 5, 1911. RENEWED NOV. 3, 1914.

1,138,927.

Patented May 11, 1915.
2 SHEETS—SHEET 1.

Witnesses
Cha.º M. Leonard.
L. M. Patterson.

Inventor
Robert C. Berry
per E. W. Bradford
Attorney

R. C. BERRY.
HACKSAW MACHINE.
APPLICATION FILED OCT. 5, 1911. RENEWED NOV. 3, 1914.
1,138,927.
Patented May 11, 1915.
2 SHEETS—SHEET 2.
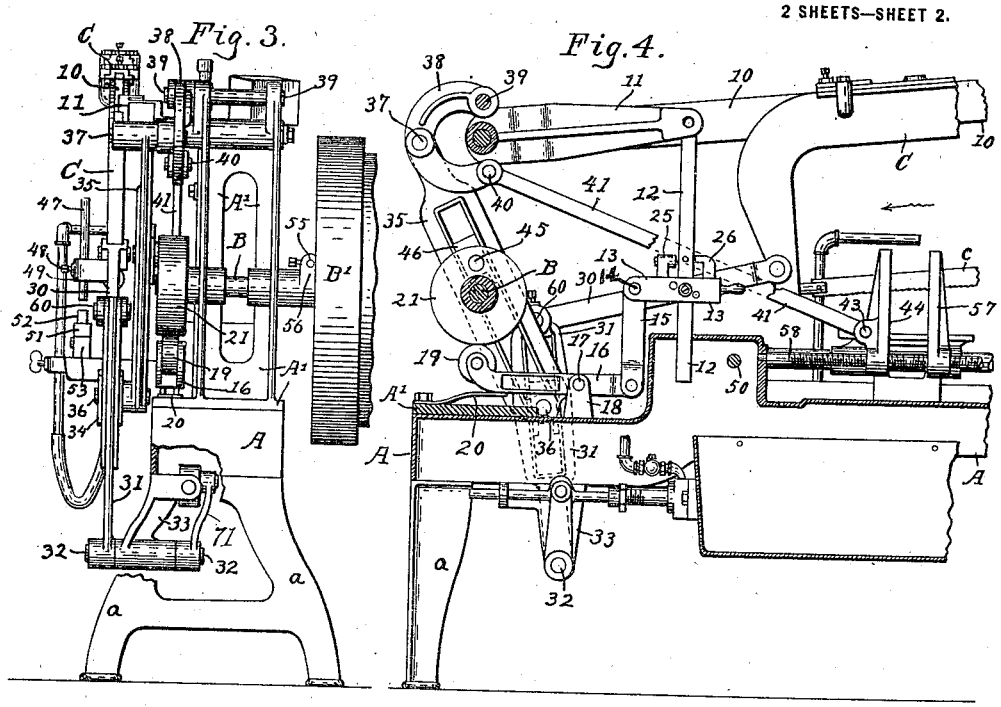
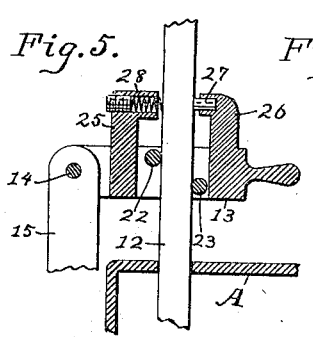
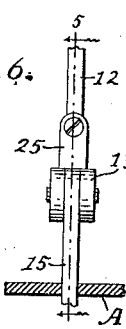
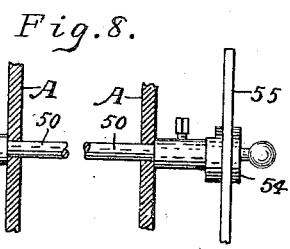
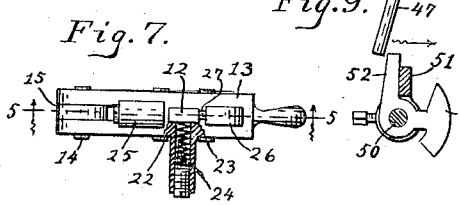
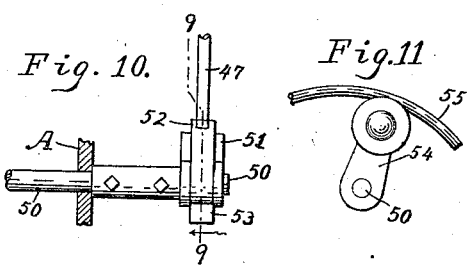
Witnesses
Chas. N. Leonard.
L. M. Patterson.
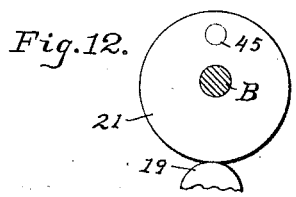
Inventor
Robert C. Berry,
E. W. Bradford
Attorney

UNITED STATES PATENT OFFICE.

ROBERT C. BERRY, OF INDIANAPOLIS, INDIANA.

HACKSAW-MACHINE.

1,138,927.   Specification of Letters Patent.   Patented May 11, 1915.

Application filed October 5, 1911, Serial No. 652,977. Renewed November 3, 1914. Serial No. 870,171.

*To all whom it may concern:*

Be it known that I, ROBERT C. BERRY, a citizen of the United States, residing at Indianapolis, in the county of Marion and State of Indiana, have invented certain new and useful Improvements in Hacksaw-Machines, of which the following is a specification.

My said invention consists in various improvements in the details of construction and arrangement of parts of hack-saw machines, whereby such a machine is provided in which the stroke of the saw is automatically regulated by the size of the work and its cutting stroke will always be at a downward angle across the work, also, whereby the saw is automatically raised free from the work on its return or non-cutting stroke, the driving gear automatically disengaged at the completion of the work, and other advantages in operation secured, all as will be hereinafter more fully described and claimed.

Figure 1:
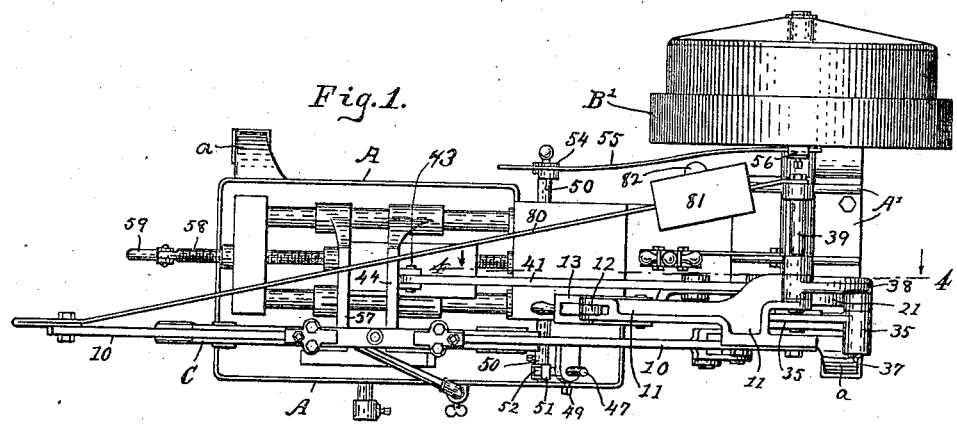
Figure 2:
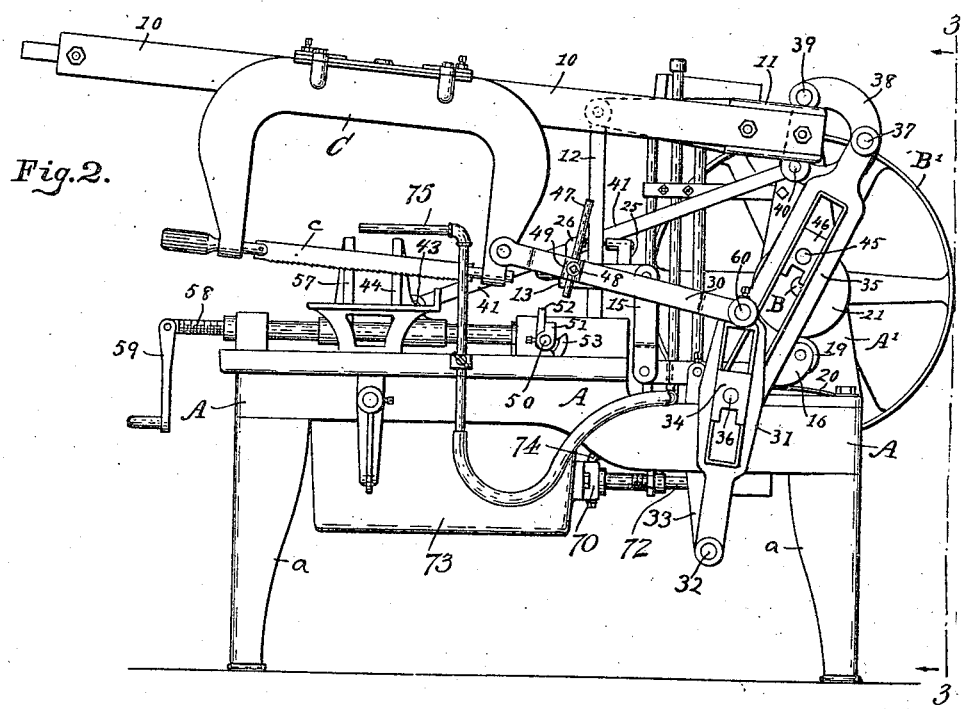

Referring to the accompanying drawings, which are made a part hereof, and on which similar reference characters indicate similar parts, Figure 1 is a top or plan view of a hack-saw machine embodying my said improvements, Fig. 2 a front elevation of the same, Fig. 3 an end view as seen when looking in the direction indicated by the arrows from the dotted line 3—3 in Fig. 2, Fig. 4 a detailed section on the dotted line 4—4 in Fig. 1, and Figs. 5, 6, 7, 8, 9, 10, 11 and 12 detail views illustrating various parts of the machine more clearly.

In said drawings the portions marked A represent the bed of the machine, B the main driving shaft, and C the hack-saw frame.

The bed A is mounted upon legs $a$ and is or may be of any appropriate size and construction for supporting various parts of the mechanism.

The main driving shaft B is mounted in bearings in an upright housing A' on one end of the machine. It is provided with a pulley B' mounted to run loosely thereon and adapted to be coupled thereto through the medium of an ordinary, or any approved, form of clutch, as will be presently described.

The hack-saw frame C is mounted to reciprocate on a bar 10 which is rigidly secured to an arm 11 pivoted on the top of housing A'. A brace 80 carrying a sliding weight 81 is also mounted on the pivot and connected to the outer end of bar 10. Weight 81 is secured in adjusted position by set screw 82. Arm 11 extends forward from the pivot toward the hack-saw frame and has a rod 12 pivoted to its front end which rod depends from its pivot and extends through a vibratory grip comprising a frame 13 connected at one end by a pivot 14 and a link 15 with a lever 16 which is mounted on a pivot 17 on a post 18 on the bed of the machine. The outer end of said lever 16 carries an anti-friction wheel 19, and a spring 20 normally supports said outer end with the wheel 19 in contact with a cam wheel 21 on main shaft B. Said rod 12 extends through the frame 13 between transverse jaws consisting of pins 22 and 23 and a spring 24 in the side of said frame 13 forces rod 12 against the opposite side and normally supports frame 13 against its own weight. The pins 22 and 23 are arranged in different horizontal planes and a distance apart just sufficient to permit rod 12 to slide freely between them when frame 13 is in a horizontal position. A pair of uprights 25 and 26 are mounted on frame 13 on each side of rod 12, the upright 26 having a stop point 27 in its inner face and the upright 25 having a spring 28 adapted to bear against the opposite edge of rod 12 and normally hold it in contact with said stop point.

The hack-saw frame C is connected by a pitman 30 to the upper end of a pivoted link 31 by a pivot 60. Said link 31 is mounted at its lower end on a pivot 32 in the lower end of a bracket 33 depending from the bed of the machine. Said link is formed slotted and a sliding block, or head, 34 is mounted in the slot therein. A second slotted link 35 is mounted at its lower end on a pivot 36 carried by said block 34 and its upper end is connected by a pivot 37 to an intermediate point of a curved (or triangular) pivot carrier 38. Said pivot carrier 38 is connected at its upper end by pivot 39 with the upper end of housing A' and its lower end is connected by a pivot 40 with a connecting rod 41, which is connected at its opposite end by a pivot 43 to the adjacent work-holding jaw 44, or otherwise to be positioned by the size of the work. Wheel 21 is provided with a crank pin 45 which engages the sliding block 46 in the slot of link 35. Jaw 44 and the coöperating jaw 57 are mounted on a right-and-left-hand screw-threaded rod 58, adapted to be operated by a crank 59 for manipulating said jaws. Said jaws thus constitute a work-holding vise.

An adjustable trip 47 is mounted by means of a set-screw 48 in a socket 49 on pitman 30. A rock-shaft 50 is mounted in bearings on an appropriate part of the frame and carries a radial projection 51 rigidly secured thereto. A strike 52 is loosely mounted on said rock shaft alongside of said projection, adapted to turn freely in one direction but contact with a horizontal part on said radial projection, when brought to a vertical position in the other direction. A weight 53 on its opposite side normally holds said strike 52 in a vertical position and in contact with projection 51. Rock-shaft 50 carries on its opposite end a crank or cam 54 upon which the forward end of a rod 55 rests. Said rod operates a clutch throwing arm 56 which is adapted to operate the clutch to couple driving pulley B' to shaft B and release it therefrom.

From the foregoing description the operation will be seen to be as follows: The clutch being in engagement with pulley B', shaft B will operate and through the connection between the crank pin 45 on wheel 21 with the sliding block 46 in link 35 will operate to vibrate said link on its pivot 37. The connection of the lower end of said link 35 with the sliding block 34 in link 31 will also operate to vibrate said link 31 on its pivot 32. The connection between the upper end of link 31 and the hack-saw frame C through the medium of pitman 30 will operate to reciprocate said hack-saw frame on bar 10 and operate the saw c upon the work held between the work-holding jaws 44 and 57. As will be observed, particularly by an inspection of Fig. 12, wheel 21 is eccentrically mounted on shaft B. The parts are so arranged relative to each other that during the cutting stroke of the hack-saw frame wheel 19 runs upon the face of wheel 21 on the side of the wheel nearest its axis so that frame 13 is held in a horizontal position and rod 12 permitted to slide downward between the pins 22 and 23 and over point 27 as the saw cuts into the work. Immediately upon the crank pin 45 passing over the center and saw frame C thus being started on its return, or non-cutting, movement, the wide side of wheel 21 comes into operation against wheel 19 and forces the outer end of lever 16 downward, lifting the outer end of frame 13 upward, so that pins 22 and 23 impinge against the opposite edges of rod 12 and lift said rod upward carrying with it the outer end of arm 11 and the bar 10 on which the hack-saw frame slides, thus lifting the saw free from the work and holding it out of contact with said work during the non-cutting stroke. When said wheel 21 reaches the point in its revolution where the saw starts on its cutting movement its narrow side is again in contact with wheel 19, which permits the lever 16, under the force of spring 20, to return to a horizontal position, also returning frame 13 to a horizontal position and thus adjusting the pins 22 and 23 to allow rod 12 to slide freely and the saw to feed into the work under the weight of the frame and pivoted bar, as is usual. The operation continues until the cut in the work reaches the point desired, which is determined by the previous adjustment of trip 47. On the finishing stroke of the saw said trip contacts with the strike 52 and rocks the shaft 50, which, through the crank 54 and rod 55, operates the clutch lever 56 and disengages the clutch from pulley B' and stops the machine.

By the arrangement described it will be noted that the pitman 30 is always operated from the pivot 60 at the upper end of link 31, which operates in a fixed arc of a circle on axis 32 and below the line of the work and thus draws said saw into the work on an angle, or down stroke, at each cutting stroke of the saw. Immediately upon the saw starting to return, the mechanism before described lifts said saw and permits it to return free from contact with the work, thus avoiding the injury to the saw commonly resulting from dragging it back with its teeth resting upon said work. The adjustment of the holding jaws, through the medium of the screw shaft 58 and crank 59, operates, through the connecting rod 41 to turn the pivot carrier 38 on its pivot 39 and throw the pivot point 37 either up or down according to the size of the work clamped between said jaws. As the pivot point 37 is thrown up, or down, the distance between said pivot and the crank pin 45 is correspondingly increased or decreased and the throw of the lower end of link 35, and consequently the throw of link 31 and the travel of the saw frame C, regulated so that the saw will have a stroke that will utilize its full cutting length regardless of the size of the work. A pump 70 is operated from a crank-arm 71 on rock-shaft 32 by a rod 72, and pumps water or oil from tank 73 through pipes 74 and 75 onto the work.

Having thus fully described my said invention, what I claim as new and desire to secure by Letters Patent, is:

1. A hack-saw machine comprising a frame, a support for the saw frame, a reciprocating saw frame mounted on said support, a vise for holding the work, means for opening and closing the jaws of said vise, a slotted link pivoted to an appropriate part of the frame, a pitman connecting the saw frame with the end of said link opposite its pivot, a sliding block in the slot of said link, another slotted link one end of which is mounted on a pivot carried by said sliding block and the other end of which is pivoted to an intermediate point of a three-point lever, said lever pivotally supported at one end on the frame, a connecting rod extending from the other end of said lever to one of the jaws on the work-holding vise, another sliding block in the slot of said second link, and an operating shaft with a crank connected with said sliding block of said second link, substantially as set forth.

2. A hack-saw machine comprising a frame, a support for the saw frame, said saw frame mounted on said support, a vibratory link mounted on a pivot on an appropriate part of the frame, a pitman connecting the opposite end of said link with the saw frame, a sliding block mounted in a slot in said link, a second link pivoted at one end to said block and at its other end mounted on an adjustable pivot, said adjustable pivot, means for adjusting said pivot, a sliding block mounted in a slot in said second link, and a driving shaft having a crank pivoted to said sliding block, substantially as set forth.

3. A hack-saw machine comprising a reciprocating saw frame, a vibratory part connected to said saw frame, and means for operating said vibratory part consisting of an operating shaft, a crank connection thereon, a link mounted to slide on said crank connection and connected at one end to a sliding block in a slot in said vibratory part and at its other end to an adjustable pivot, said sliding block, said adjustable pivot, and means for adjusting the same, substantially as set forth.

4. A hack-saw machine comprising a reciprocating saw frame, a vibratory part connected therewith for operating the same, and means for controlling the vibration of said part and the stroke of said saw frame embodying a link slidably connected at one end with said vibratory part, and at its other end connected with a movable pivot, said movable pivot, and means for moving said pivot, substantially as set forth.

5. A hack-saw machine comprising a reciprocating saw frame, a vibratory part connected therewith for operating the same, and means for controlling the vibration of said part and the stroke of said saw frame embodying a link slidably connected at one end with said vibratory part, and at its other end connected with a movable pivot, said movable pivot, and means for moving said pivot through the medium of the size of the work, substantially as set forth.

6. A hack-saw machine comprising a reciprocating saw frame, a swining part connected therewith by a pitman, the connection of said pitman with said swinging part being on a line below the connection with the saw frame whereby the cutting stroke of said saw will be in a downward direction across the work, and means for regulating the stroke of said saw embodying an operating crank shaft, a link mounted to slide on the crank thereof and connected at one end to said swinging part by a sliding connection and at its other end to an adjustable pivot, means for making said sliding connection, said adjustable pivot, and means for adjusting the same, substantially as set forth.

7. A hack-saw machine comprising a reciprocating saw frame, a swinging part connected therewith by a pitman, the connection of said pitman with said swinging part being on a line below the connection with the saw frame whereby the cutting stroke of said saw will be in a downward direction across the work, and means for regulating the stroke of said saw by the size of the work embodying an operating shaft, a link operatively connected therewith at an intermediate point, and at one end to slide in said swinging part and at its other end to an adjustable pivot, said adjustable pivot, and means for adjusting said pivot through the medium of the size of the work, substantially as set forth.

8. A hack-saw machine comprising a reciprocating saw frame, a vibratory part mounted on a fixed pivot and connected with the saw frame by a pivot mounted in fixed position relative to the pivot of said vibratory part, and means for operating said vibratory part embodying an adjustable pivot, a connection from said adjustable pivot to said vibratory part, and an operating shaft connected therewith, substantially as set forth.

9. A hack-saw machine comprising a reciprocating saw frame, a vibratory part mounted on a fixed pivot and connected with the saw frame by a pivot mounted in fixed relation to the pivot of said vibratory part, and means for operating said vibratory part embodying an adjustable pivot for controlling the length of vibration of said vibratory part, means for adjusting said pivot through the medium of the size of the work, a connection from said adjustable pivot to said vibratory part, and an operating shaft for said machine, substantially as set forth.

10. A hack-saw machine comprising a frame, a support for the said frame, said saw-frame mounted to reciprocate on said support, a vibratory part operatively connected to said saw frame, another vibratory part operatively connected to said first mentioned vibratory part by an adjustable connection, and means for imparting motion to said second vibratory part, substantially as set forth.

11. A hack-saw machine comprising a frame, a pivoted support for the saw frame, said saw frame mounted to reciprocate on said pivoted support, a vibratory part connected to said saw frame to operate the same at a downward angle in its cutting stroke, a second vibratory part operatively connected to said first named vibratory part, and means for imparting motion to said second vibratory part, substantially as set forth.

12. A hack-saw machine comprising a machine frame, a pivoted support for the saw frame, said saw frame mounted to reciprocate on said support, an operating shaft, a cam wheel on said operating shaft carrying a crank pin, a connection between said crank pin and said saw frame for reciprocating it, a lever one end of which is in operative contact with said cam wheel and the other end of which carries a grip comprising a frame with adjustable jaws, a rod depending from said pivoted support and extending through said grip between said jaws, and means for operatively engaging said grip with said depending rod when said frame is tilted and elevated by the cam wheel, substantially as set forth.

13. A hack-saw machine comprising a machine frame, a support, a saw frame mounted to reciprocate on said support, vibratory operating links, means for vibrating said links, a pitman connecting said saw frame with one of said vibratory links, a rock-shaft, a strike mounted to have a limited idle tilting movement when turned in one direction and a tilting movement to turn said rock-shaft when the strike is moved in the opposite direction, an adjustable trip on said pitman arranged to operate against said strike, and an operative connection between said rock-shaft and the driving mechanism, whereby when said trip operates said strike in one direction the driving mechanism will be disengaged, substantially as set forth.

14. A hack-saw machine comprising a reciprocating saw, means for operating said saw, means for freeing the points of the teeth from the work on its non-cutting stroke comprising a pivoted frame, gripping jaws carried thereby, a bar connected with the saw support and extending between said jaws, a bearing point carried by said pivoted frame a distance above the gripping jaw on one side thereof, a spring mounted in said frame above the gripping jaw on the other side and adapted to bear against the opposite side of said bar, a lever for tilting said frame to bring said gripping jaws into action against the edges of said bar, and a connection with the operating shaft for actuating said lever on each return movement of the saw frame, substantially as set forth.

15. A hack-saw machine comprising a reciprocating saw frame, operating means, and means for connecting said operating means to said reciprocating saw frame embodying a set of links pivotally mounted and joined by pivotal and slidable connections, and a connection from said links to said saw frame, substantially as set forth.

16. A hack-saw machine comprising a reciprocating saw, and means for operating said saw consisting of vibratory links hung on pivots and connected together by a pivotal connection, and a connecting part running from one of said links to said saw, substantially as set forth.

17. A hack-saw machine comprising a reciprocating saw frame, a power shaft, compound links slidably and pivotally connected one carried on an adjustable pivot and the other pivoted to the machine frame and one operatively connected to said power shaft and the other to said saw frame, a connection from said adjustable pivot to the work holding means, and said work holding means, substantially as set forth.

In witness whereof, I have hereunto set my hand and seal at Indianapolis, Indiana, this 30th day of September, A. D. nineteen hundred and eleven.

ROBERT C. BERRY. [L. s.]

Witnesses:
   E. W. BRADFORD,
   L. M. PATTERSON.